L. A. FOOTE.
SEAL.
APPLICATION FILED JAN. 30, 1907.
920,449.
Patented May 4, 1909.
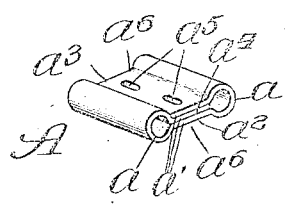
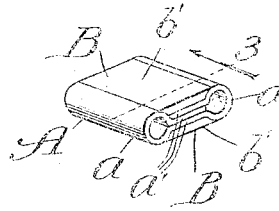
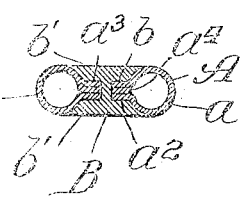
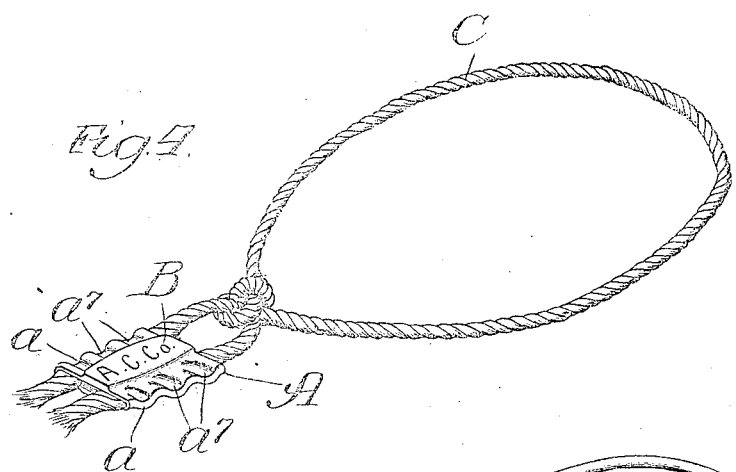
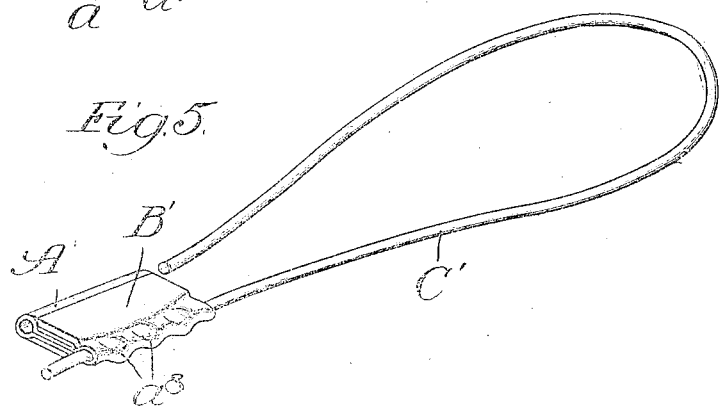
Witnesses:
Inventor:
Lewis A. Foote,
By Dyrenforth, Dyrenforth, Lee & Wiles,
Attys.

UNITED STATES PATENT OFFICE.

LEWIS A. FOOTE, OF CHICAGO, ILLINOIS.

SEAL.

No. 920,449.     Specification of Letters Patent.     Patented May 4, 1909.

Application filed January 30, 1907. Serial No. 354,942.

*To all whom it may concern:*

Be it known that I, LEWIS A. FOOTE, a citizen of the United States, residing at Chicago, in the county of Cook and State of Illinois, have invented a new and useful Improvement in Seals, of which the following is a specification.

My invention relates particularly to seals adapted for use in connection with shackles, cords, and the like; and my primary object is to provide a seal involving a minimum cost to manufacture and a maximum of safety features, coupled with convenience in use.

The invention is illustrated in the accompanying drawing, in which—

Figure 1 is a perspective view of a sheet-metal member employed in the construction of the seal; Fig. 2, a perspective view of a completed seal adapted to receive the ends of a shackle or of a tying-cord; Fig. 3, a transverse section taken as indicated at line 3 of Fig. 2 and illustrating in detail the manner in which a soft-metal, or lead, connecting member is employed in connection with the sheet-metal member shown in Fig. 1; Fig. 4, a perspective view showing the seal illustrated in Fig. 2 applied to the ends of a bag-tie and press-fastened thereon; Fig. 5, a perspective view of the seal in connection with a permanently attached wire shackle.

In the construction illustrated in Figs. 1 to 4, inclusive, A represents a sheet-metal member forming a part of my improved seal; B, a soft-metal connecting member forming a part of said seal, and C, a bag-tie or a cord-shackle to the ends of which the seal shown in Fig. 2 has been applied and seal-pressed thereon. The member A may be conveniently formed of an elongated piece of sheet-metal bent upon itself and having shackle-eyes formed therein, as illustrated. It comprises, in the formed condition, shackle-eyes $a$ and a connecting web $a^1$. In the preferred formation, an intermediate transverse section $a^2$ of the metal strip forms a portion of the web $a^1$, the adjoining portions of the metal are curved into cylindrical shape to form the eyes $a$, and the end-margins $a^3$ $a^4$ of the strip are caused to overlap and lie upon the section $a^2$ to form the remainder of the web $a^1$. The overlapping margins $a^3$ $a^4$ and the underlying section $a^2$ are provided with elongated openings $a^5$ adapted to receive the two-part shank or web of the connecting member B. As thus described, the member A is provided between its eyes with external open channels $a^6$ adapted to receive the elongated heads of the connecting member B.

The member B is preferably formed of lead, or a compound thereof, and has a two-part web or shank $b$ extending through the openings $a^5$, and has elongated heads $b^1$ formed integrally with said shank and received by the open channels $a^6$ and thus confined between the eyes $a$ of the sheet-metal member. The member B may be formed by casting lead in connection with the member A, as formed in Fig. 1, thereby giving to the lead the formation illustrated in Figs. 2 and 3, it being understood that the lead runs through the openings $a^5$ to form the two-part shank connecting the heads $b^1$. Preferably, the main portions of the eye-forming sections of the sheet-metal member are left exposed, as illustrated.

When the seal is applied to the ends of a cord, as illustrated in Fig. 4, the ends of the cord are slipped into the eyes $a$, and a seal-press is employed to crimp the eyes upon the cord and apply such characters to the lead portion of the seal as may be desired. In Fig. 4, $a^7$ indicates crimps or corrugations which have been produced in the shackle-receiving eyes $a$, the shackle-receiving eyes having been flattened in the same operation.

In the construction illustrated in Fig. 5, $A^1$ represents a sheet-metal member similar to the member A; $B^1$, a lead member similar to the member B; and $C^1$, a wire shackle. The construction is the same as shown in Figs. 1 to 3 inclusive, except that the shackle-eyes are smaller than illustrated in said figures, and one end of the shackle $C^1$ has been inserted and permanently secured in one of the eyes by providing crimps $a^8$. In use, the free end of the shackle is inserted in the remaining eye of the member $A^1$, and the seal-press is then applied to compress said eye upon the free end of the shackle and apply the desired characters to the lead portion of the seal.

It is noteworthy that the improved construction provides for the use of a minimum amount of lead for receiving the impression of the characters to be applied thereto, and leaves the shackle-gripping portions of the sheet-metal member exposed to view. This is important, inasmuch as it is impossible to remove the shackle from its connection without so injuring the sheet-metal member as to render it impossible to remedy or cover up the injury. The use of the sheet-metal not only cheapens the construction, but provides, in addition to the advantage just mentioned, for the firm gripping of the shackle by the metal.

The foregoing detailed description has been given for clearness of understanding only, and no undue limitation is to be understood therefrom.

What I regard as new, and desire to secure by Letters Patent, is—

1. In combination, a shackle, a seal comprising a sheet-metal member having one edge-portion permanently attached to one end of said shackle and having at its opposite edge a straight shackle-eye, said sheet-metal member having intermediate externally open channels extending from end to end of the seal, and lead confined in said channels throughout their length, leaving the sheet-metal of said shackle-eye exposed.

2. In combination, a shackle, a seal comprising a sheet-metal member having shackle-eyes at its lateral edges, one end of said shackle extending into one of said eyes and the metal compressed thereon to form a permanent attachment, said sheet-metal member having superposed portions between said eyes with perforations therein, and a soft-metal connecting member having a web or shank extending through said perforations and having heads lying parallel with said eyes between the planes thereof, for the purpose set forth.

LEWIS A. FOOTE.

In presence of—
A. U. THORIEN,
J. H. LANDES.